US012510795B2

(12) United States Patent
Xu et al.

(10) Patent No.: US 12,510,795 B2
(45) Date of Patent: Dec. 30, 2025

(54) OPTICAL DEVICE, AN ELECTRONIC DEVICE, AND A PROGRAMMABLE PHOTONIC INTEGRATED CIRCUIT

(71) Applicant: INSPUR SUZHOU INTELLIGENT TECHNOLOGY CO., LTD., Suzhou (CN)

(72) Inventors: Zhe Xu, Jinan (CN); Chen Li, Jinan (CN); Dongdong Jiang, Jinan (CN); Ruyang Li, Jinan (CN); Yaqian Zhao, Jinan (CN); Rengang Li, Jinan (CN)

(73) Assignee: INSPUR SUZHOU INTELLIGENT TECHNOLOGY CO., LTD., Suzhou (CN)

( * ) Notice: Subject to any disclaimer, the term of this patent is extended or adjusted under 35 U.S.C. 154(b) by 280 days.

(21) Appl. No.: 18/269,926

(22) PCT Filed: Sep. 29, 2021

(86) PCT No.: PCT/CN2021/121896
§ 371 (c)(1),
(2) Date: Jun. 27, 2023

(87) PCT Pub. No.: WO2022/262147
PCT Pub. Date: Dec. 22, 2022

(65) Prior Publication Data
US 2024/0061282 A1 Feb. 22, 2024

(30) Foreign Application Priority Data

Jun. 17, 2021 (CN) .......................... 202110671577.5

(51) Int. Cl.
*G02F 1/225* (2006.01)
*G02B 6/122* (2006.01)
(Continued)

(52) U.S. Cl.
CPC ............ *G02F 1/225* (2013.01); *G02B 6/1223* (2013.01); *G02B 6/124* (2013.01); *G02F 1/0072* (2013.01);
(Continued)

(58) Field of Classification Search
CPC ........ G02B 6/12; G02B 6/1223; G02B 6/124; G02F 1/225
See application file for complete search history.

(56) References Cited

U.S. PATENT DOCUMENTS 6,278,523 B1 8/2001 Gorecki
6,522,799 B1 2/2003 Bazylenko et al.
(Continued)

FOREIGN PATENT DOCUMENTS

CN 1670556 A 9/2005
CN 104020137 A 9/2014
(Continued)

OTHER PUBLICATIONS

International Search Report dated Mar. 15, 2022; International Application No. PCT/CN2021/121896.
(Continued)

*Primary Examiner* — Michael Stahl
(74) *Attorney, Agent, or Firm* — Maschoff Brennan

(57) ABSTRACT

The optical device includes: a first coupler having an adjustable beam splitting ratio; a sensing arm and a programmable modulation arm which are connected to the first coupler; and a second coupler having an input port connected to the sensing arm and the programmable modulation arm and an output port connected to a photodetector. The sensing arm is used for generating, by means of a slot waveguide, a first signal from a first light wave beam outputted by the first coupler. The programmable modulation arm is used for obtaining, by utilizing a grating, a second signal according
(Continued)

to a second light wave beam outputted by the first coupler, and the grating is a nano grating generated under a pre-programmed voltage parameter of a programmable piezoelectric transducer of the programmable modulation arm. An electronic device and a programmable photonic integrated circuit are also disclosed herein.

20 Claims, 3 Drawing Sheets

(51) Int. Cl.
*G02B 6/124* (2006.01)
*G02F 1/00* (2006.01)
*G02F 1/11* (2006.01)
*G02F 1/125* (2006.01)
*G02B 6/12* (2006.01)

(52) U.S. Cl.
CPC .............. *G02F 1/113* (2013.01); *G02F 1/125* (2013.01); *G02B 2006/12159* (2013.01); *G02F 2201/307* (2013.01); *G02F 2201/58* (2013.01)

(56) References Cited

U.S. PATENT DOCUMENTS

| | | |
|---|---|---|
| 2002/0159702 A1 | 10/2002 | Liu et al. |
| 2005/0135723 A1 | 6/2005 | Carr |
| 2013/0071061 A1 | 3/2013 | Tu et al. |
| 2018/0088274 A1 | 3/2018 | LeGrange et al. |

FOREIGN PATENT DOCUMENTS

| | | |
|---|---|---|
| CN | 106019645 A | 10/2016 |
| CN | 108037597 A | 5/2018 |
| CN | 110325840 A | 10/2019 |
| CN | 110943836 A | 3/2020 |
| CN | 111394236 A | 7/2020 |
| CN | 111609873 A | 9/2020 |
| CN | 113253403 A | 8/2021 |
| JP | 58211121 A | 12/1983 |
| WO | 2018150205 A1 | 8/2018 |
| WO | 2022262147 A1 | 12/2022 |

OTHER PUBLICATIONS

Written Opinion of the International Searching Authority; International Application No. PCT/CN2021/121896.
The First Office Action of corresponding Chinese application No. 2021106715775.
The Second Office Action; Chinese Application No. 2021106715775.
Notification to Grant Patent Right of corresonding CN application No. 202110671577.5.
Cao, Xiaoping, Mesh-Structure-Enabled Programmable Multi-Task Photonic Signal Processor on a Silicon Chip; pubs.acs.org on May 11, 2020; 54 pages.

OPTICAL DEVICE, AN ELECTRONIC DEVICE, AND A PROGRAMMABLE PHOTONIC INTEGRATED CIRCUIT

CROSS-REFERENCE TO RELATED APPLICATION

This application is the U.S. National Stage of PCT/CN2021/121896 filed on Sep. 29, 2021, which claims priority of Chinese Patent Application No. 202110671577.5, entitled "Optical Device, Electronic Device, and Programmable Photonic Integrated Circuit", filed with the Chinese Patent Office on Jun. 17, 2021, which is hereby incorporated by reference in its entirety.

FIELD

The present application relates to the field of computer technology, in particular to an optical device, an electronic device, and a programmable photonic integrated circuit.

BACKGROUND

Currently, most of PICs (Photonic Integrated Circuits) are ASPICs (application-specific photonic integrated circuits) designed and manufactured for a specific application, such as cell detection modules or all-optical logic gates. Once processing and fabrication are completed, their optical path structure and working efficiency are fixed, and they cannot be applied to various application fields and application scenarios.

Therefore, how to provide a solution to the above technical problem is a problem to be solve currently by those skilled in the art.

SUMMARY

An object of the present application is to provide an optical device, an electronic device, and a programmable photonic integrated circuit. The optical logic gate operation can be performed according to an optical signal, biosensor detection can also be performed, the present application can adapt to multiple scenes, and the repeated use and sustained use of the device are promoted. A specific solution is as follows:

The present application provides an optical device, including:
  a first coupler having an adjustable beam splitting ratio; a sensing arm and a programmable modulation arm which are connected to the first coupler, wherein the sensing arm is configured to generate, by means of a slot waveguide, a first signal from a first light wave beam outputted by the first coupler, and the programmable modulation arm is configured to obtain, by utilizing the diffraction effect of a grating, a second signal according to a second light wave beam outputted by the first coupler, wherein the grating is a nano grating generated under a pre-programmed voltage parameter of a programmable piezoelectric transducer of the programmable modulation arm; and
  a second coupler having an input port connected to the sensing arm and the programmable modulation arm and an output port connected to a photodetector.

In an embodiment of the present application, the programmable modulation arm includes a second strip waveguide, a quartz crystal that encapsulates a predetermined length of the second strip waveguide, and a sound absorber and the programmable piezoelectric transducer that are provided on two sides of the quartz crystal,
  wherein the corresponding grating is formed within the second strip waveguide in the quartz crystal under the pre-programmed voltage parameter of the programmable piezoelectric transducer, and the second signal is generated from the second light wave beam under the diffraction effect of the grating.

In an embodiment of the present application, the sensing arm includes the slot waveguide and a first strip waveguide, wherein the slot waveguide is provided at a set position on the first strip waveguide.

In an embodiment of the present application, the slot waveguide and the first strip waveguide of the sensing arm, and the second strip waveguide of the programmable modulation arm are all high refractive index silicon waveguides.

In an embodiment of the present application, the slot waveguide includes: a silicon dioxide substrate, a first silicon structure and a second silicon structure provided on the silicon dioxide substrate, wherein the distance between the first silicon structure and the second silicon structure is a nanoscale distance.

Further, the first strip waveguide and the second strip waveguide each include: a silicon dioxide substrate, and a silicon structure provided on the silicon dioxide substrate.

In an embodiment of the present application, the programmable piezoelectric transducer is a piezoelectric ceramic transducer.

The present application provides an electronic device including an optical device as described above, wherein the electronic device is an optical logic gate and/or a biosensor.

The present application provides a programmable photonic integrated circuit, including:
  a laser;
  an optical device as described above connected to the laser;
  a photodetector connected to the optical device; and
  a computer software controller connected to the optical device and configured to control a voltage parameter of a programmable piezoelectric transducer of the optical device.

In an embodiment of the present application, the computer software controller is further configured to control a beam splitting ratio of a first coupler of the optical device.

In an embodiment of the present application, the laser is a tunable laser; and
  correspondingly, the computer software controller is configured to control a light source parameter of the tunable laser, and the light source parameter corresponds to an input optical signal of a first coupler of the optical device.

In an embodiment of the present application, a plurality of optical devices are included, and the plurality of optical devices are cascaded.

The present application provides an optical device, including: a first coupler having an adjustable beam splitting ratio; a sensing arm and a programmable modulation arm which are connected to the first coupler, wherein the sensing arm is configured to generate, by means of a slot waveguide, a first signal from a first light wave beam outputted by the first coupler, and the programmable modulation arm is configured to obtain, by utilizing the diffraction effect of a grating, a second signal according to a second light wave beam outputted by the first coupler, wherein the grating is a nano grating generated under a pre-programmed voltage parameter of a programmable piezoelectric transducer of the programmable modulation arm; and a second coupler having an input port connected to the sensing arm and the programmable modulation arm and an output port connected to a photodetector.

Hence, in the present application, the beam splitting ratio of the first coupler and the voltage parameter of the programmable piezoelectric transducer can be adjusted, and an ultrasonic field that changes in the form of an electrical signal is obtained according to the voltage parameter to form a nano-grating. A change in the refractive index of the grating causes a change in the phase of the light wave. When the second light wave beam passes through the programmable modulation arm, the light carrier wave is modulated into an intensity or phase modulated wave carrying information, i.e., the second signal, due to the diffraction effect of the grating, thus achieving modulation of the optical signal. The slot waveguide of the sensing arm is a nano-slot, causing optical limitation and optical amplification of the first light wave beam at the nano-scale, and generating the first signal. Thus, the optical device of the present application can sense a small change in the environment. The small change leads to an optical phase shift, and the change of the environment can be obtained from the optical phase shift. After the first signal and the second signal are coupled by the second coupler, an optical signal with constructive or destructive interference is formed at the output end, and is finally detected by the photodetector. Hence, according to the present application, the optical logic gate operation can be performed according to an optical signal, biosensor detection can also be performed, the present application can adapt to multiple scenes, and the repeated use and sustained use of the device are promoted.

The present application also provides an electronic device and a programmable photonic integrated circuit, both having the above beneficial effects, which are not repeated here.

BRIEF DESCRIPTION OF THE DRAWINGS

To describe technical solutions in embodiments of the present application or in the prior art more clearly, a brief introduction to the drawings for use in description of embodiments or the prior art will be given below. Obviously, the drawings described below are only embodiments in the present application, and to those of ordinary skill in the art, other drawings may also be obtained based on the provided drawings without creative work.

DETAILED DESCRIPTION

Figure 1:
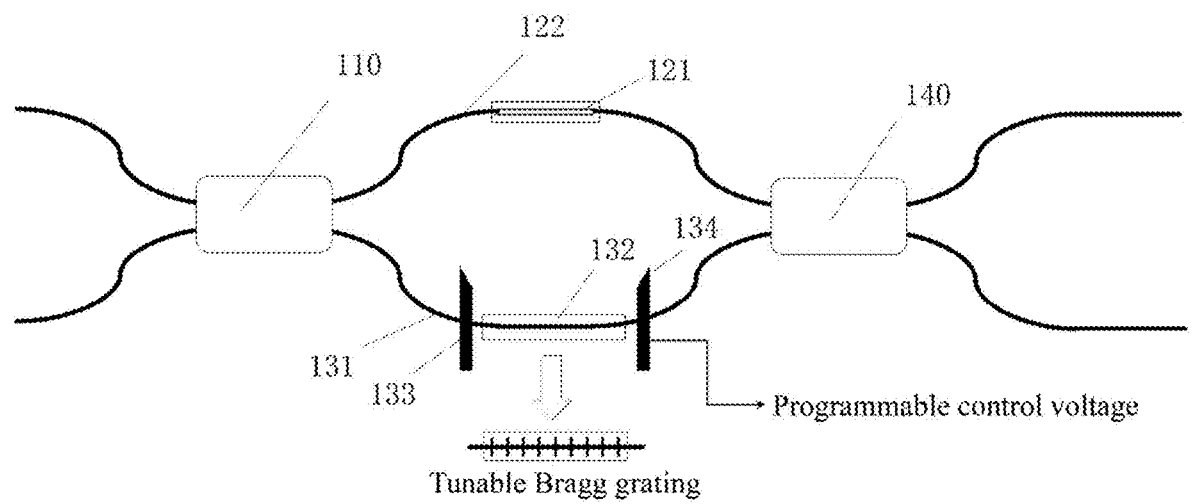
FIG. 1 is a structural diagram of an optical device provided in embodiments of the present application.

To make the objects, technical solutions and advantages of embodiments of the present application clearer, the technical solutions in the embodiments of the present application will be described below clearly and completely in conjunction with the drawings in the embodiments of the present application. Obviously, the embodiments described are part of, but not all of, the embodiments of the present application. All other embodiments obtained by those of ordinary skill in the art without creative work, based on the embodiments in the present application, fall into the protection scope of the present application.

Currently, most of PICs (Photonic Integrated Circuits) are ASPICs (application-specific photonic integrated circuits) designed and manufactured for a specific application, such as cell detection modules or all-optical logic gates.

Once processing and fabrication are completed, their optical path structure and working efficiency are fixed, and they cannot be applied to various application fields and application scenarios.

To solve the above technical problem, the present embodiment provides an optical device, including: a first coupler having an adjustable beam splitting ratio; a sensing arm and a programmable modulation arm which are connected to the first coupler, wherein the sensing arm is configured to generate, by means of a slot waveguide, a first signal from a first light wave beam outputted by the first coupler, and the programmable modulation arm is configured to obtain, by utilizing the diffraction effect of a grating, a second signal according to a second light wave beam outputted by the first coupler, wherein the grating is a nano grating generated under a pre-programmed voltage parameter of a programmable piezoelectric transducer of the programmable modulation arm; and a second coupler having an input port connected to the sensing arm and the programmable modulation arm and an output port connected to a photodetector.

Hence, in the present application, the beam splitting ratio of the first coupler and the voltage parameter of the programmable piezoelectric transducer can be adjusted, and an ultrasonic field that changes in the form of an electrical signal is obtained according to the voltage parameter to form a nano-grating. A change in the refractive index of the grating causes a change in the phase of the light wave. When the second light wave beam passes through the programmable modulation arm, the light carrier wave is modulated into an intensity or phase modulated wave carrying information, i.e., the second signal, due to the diffraction effect of the grating, thus achieving modulation of the optical signal. The slot waveguide of the sensing arm is a nano-slot, causing optical limitation and optical amplification of the first light wave beam at the nano-scale, and generating the first signal. Thus, the optical device of the present application can sense a small change in the environment. The small change leads to an optical phase shift, and the change of the environment can be obtained from the optical phase shift. After the first signal and the second signal are coupled by the second coupler, an optical signal with constructive or destructive interference is formed at the output end, and is finally detected by the photodetector. Hence, according to the present application, the optical logic gate operation can be performed according to an optical signal, biosensor detection can also be performed, the present application can adapt to multiple scenes, and the repeated use and sustained use of the device are promoted.

Referring to FIG. 1, FIG. 1 is a structural diagram of an optical device provided in embodiments of the present application, including:

a first coupler 110 having an adjustable beam splitting ratio; a sensing arm and a programmable modulation arm which are connected to the first coupler 110, wherein the sensing arm is configured to generate, by means of a slot waveguide 121, a first signal from a first light wave beam outputted by the first coupler 110, and the programmable modulation arm is configured to obtain, by utilizing the diffraction effect of a grating, a second signal according to a second light wave beam outputted by the first coupler 110, wherein the grating is a nano grating generated under a pre-programmed voltage parameter of a programmable piezoelectric transducer 134 of the programmable modulation arm; and a second coupler 140 having an input port connected to the sensing arm and the programmable modulation arm and an output port connected to a photodetector.

The first coupler 110 is further described. The first coupler 110 is a coupler having an adjustable beam splitting ratio. It may be a 50/50 coupler, and of course, may also be other coupler, which will not be limited in the present embodiment, and may be chosen by a user according to actual needs, so long as the object of the present embodiment can be achieved. Further, the beam splitting ratio of the first coupler 110 can be modified by a user according to actual needs using a computer software controller. A ratio of the first light wave beam to the second light wave beam can be determined by modifying the beam splitting ratio. It may be 0:1, or 1:0, or n1:n2, where n1 and n2 are set according to actual needs.

The sensing arm is further described. The sensing arm includes a slot waveguide 121, and of course may also include a first strip waveguide 122. The slot waveguide 121 is provided at a set position on the first strip waveguide 122, and the set position may be set according to actual needs. A nano-slot of the slot waveguide 121 can cause optical field limitation and amplification of an evanescent wave at a nanoscale, and can sense a small change in the nearby environment, leading to an optical phase shift, to detect multiple or even a single biological small molecule. After the light waves pass through the MZI (Mach-Zehnder interferometers) arms (sensing arm and programmable modulation arm), both the first signal and the second signal generated by small changes in optical phase shifts of the light waves can, after being coupled at the second coupler 140 (with a fixed beam splitting ratio), form constructive or destructive interference at an output end of the second coupler 140 to obtain a first output signal and a second output signal, which are detected by the photodetector. The slot waveguide 121 in the present embodiment may be a high refractive index silicon waveguide. Due to a very high refractive index of silicon, spatial limitation and intensity enhancement of an optical field pattern is liable to occur in the nano-slot of the slot waveguide 121, which is conducive to optical trapping phenomenon, and it can be applied to single-molecule detection and other near-field optical scenarios. In an embodiment of the present application, a light wave range of an input optical signal in the present embodiment can be in the infrared band, and can be mainly focused around a biological wavelength of 1064 nm and a communication wavelength of 1550 nm.

Figure 2A:
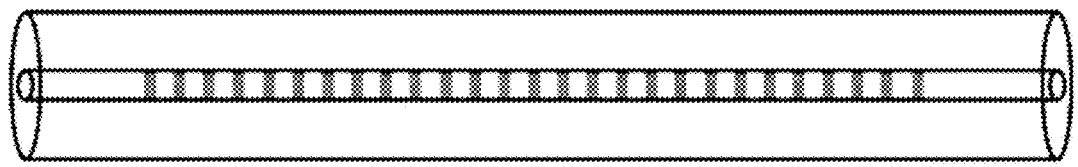
FIG. 2a is a schematic diagram of a uniform fiber grating provided in embodiments of the present application.
Figure 2B:
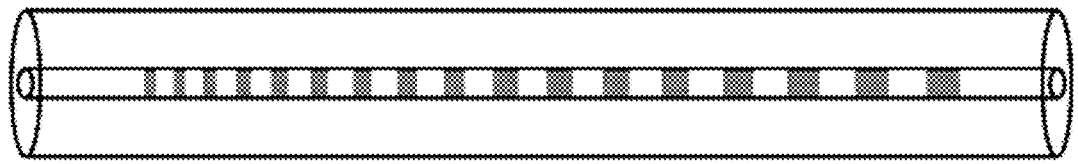
FIG. 2b is a schematic diagram of a chirped fiber grating provided in embodiments of the present application.
Figure 2C:
FIG. 2c is a schematic diagram of a phase shifted fiber grating provided in embodiments of the present application.
Figure 2D:
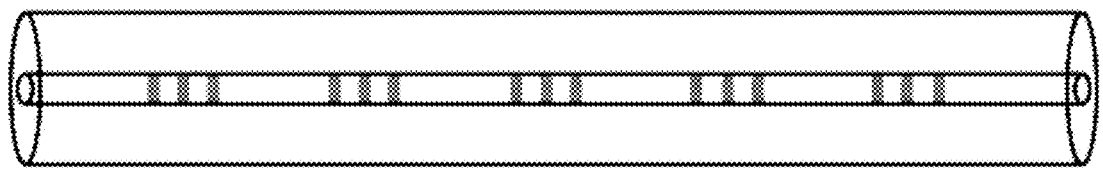
FIG. 2d is a schematic diagram of a sampled fiber grating provided in embodiments of the present application.

The programmable modulation arm is further described. The programmable modulation arm is configured to obtain, by utilizing the diffraction effect of a grating, a second signal according to a second light wave beam outputted by the first coupler 110, wherein the grating is generated under a pre-programmed voltage parameter of a programmable piezoelectric transducer 134 of the programmable modulation arm. This embodiment does not limit the structure of the programmable modulation arm, and it can be set by a user according to actual needs, so long as the object of the present embodiment can be achieved. In an embodiment of the present application, the grating is a Bragg grating. The Bragg grating may be any one of a uniform fiber grating, a uniform long-period fiber grating, an apodized fiber grating, a phase-shifted fiber grating, a sampled fiber grating, and a chirped fiber grating. Referring to FIGS. 2a-2d, FIG. 2a is a schematic diagram of a uniform fiber grating provided in embodiments of the present application, FIG. 2b is a schematic diagram of a chirped fiber grating provided in embodiments of the present application, FIG. 2c is a schematic diagram of a phase-shifted fiber grating provided in embodiments of the present application, and FIG. 2d is a schematic diagram of a sampled fiber grating provided in embodiments of the present application.

In an implementable embodiment, the programmable modulation arm includes a second strip waveguide 131, a quartz crystal 132 that encapsulates a predetermined length of the second strip waveguide 131, and a sound absorber 133 and the programmable piezoelectric transducer 134 that are provided on two sides of the quartz crystal 132, wherein the corresponding Bragg grating is formed within the second strip waveguide in the quartz crystal 132 under the pre-programmed voltage parameter of the programmable piezoelectric transducer 134, and the second signal is generated from the second light wave beam under the diffraction effect of the grating.

The programmable modulation arm includes an acousto-optic modulation module and a strip waveguide. The acousto-optic modulation module acts on the second strip waveguide 131 through an encapsulating layer of the quartz crystal 132. The acousto-optic modulation module specifically includes the quartz crystal 132 that encapsulates the outside of the second strip waveguide 131, the optically transparent sound absorber 133, and the programmable piezoelectric transducer 134. Specifically, a computer software controller controls a voltage parameter (including a voltage magnitude and period) of an external voltage signal to act on the programmable piezoelectric transducer 134, and implements electroacoustic conversion into an ultrasonic field that changes in the form of an electrical signal to form a grating. A change in the refractive index of the grating causes a change in the phase of the second light wave beam passing through the quartz crystal 132 to generate the second signal. When the second light wave beam passes through the programmable modulation arm, the second light wave beam is modulated into an intensity or phase modulated wave carrying information, i.e., the second signal, due to the diffraction effect of the grating.

The second coupler 140 is further described. The two waves, i.e., the first signal and the second signal, passing through the sensing arm and the programmable modulation arm are inputted through an input port into the second coupler (e.g., a 50/50 coupler) and then passed to two output ports. Light waves (a first output optical signal and a second output optical signal) at the output ports are a linear combination of the light waves at the input port. Throughout the optical path, both power and phase shift are controlled by the computer software controller according to a target function. At the output ports, the output optical signals may be outputted from only one port or from both ports at the same time in a certain ratio, and the magnitude of the output optical signal intensity can be continuously controlled. Since the optical path is reversible, the present embodiment can work forwardly or reversely if used as an optical logic gate. Since photons are bosons, this optical device can transmit and process two light wave signals of different wavelengths at the same time without mutual interference. Hence, this optical device can perform analog operations.

It can be understood that corresponding parameters of both the first coupler 110 and the programmable piezoelectric transducer 134 in the present embodiment can be adjusted and controlled by the computer software controller. Further, the input optical signal may also be adjustable. Therefore, a user can control three parts by programming a PICs device as needed. In a first part, laser light sources can be adjusted, input wavelengths can be selected as needed, and output wavelengths of two lasers can be same or different. Second and third parts mainly involve the optical device, specifically the first coupler 110 and the programmable piezoelectric transducer 134 of the optical device. The beam splitting ratio of the first coupler 110 can be adjusted according to the actual situation. The programmable piezoelectric transducer 134 is controlled by programming, and an input acoustic wave is controlled by voltage, so that a nanometer Bragg grating is formed on the strip waveguide of the quartz crystal 132. Structural parameters of the Bragg grating are adjustable and controllable by the computer software controller, and its refractive index changes with the period, causing phase modulation in the path of light wave transmission.

A programmable photonic integrated circuit in the present embodiment can be formed by fabricating a MZI structure on an insulated substrate silicon wafer. Light waves propagate in waveguides, and are inputted into a 2×2 coupler, that is, an optical device in the present embodiment, where they enter an MZI optical path through a first coupler 110 (which may be a 50/50 coupler), and undergo an interference effect of the two light waves, and finally a signal is outputted from a second coupler 140, a 50/50 beam splitter. Its operating mechanism is further described. The optical device determines the programmable functional optical path and how to configure it, wherein the programmable modulation arm acts as an optical phase shifter, and change in the refractive index of the waveguide is controlled by the programmable modulation arm, so that optical signals passing through the MZI are controlled more precisely, resulting in better performance of the PICs. Specifically, in FIG. 1, the optical device acts as a 2×2 optical logic gate, and light (of the same or different wavelengths) from two input waveguides is inputted into the first coupler 110, with an input power being controlled by the computer software controller, and distributed to two output waveguides of the first coupler 110. The two output waveguides form two arms of the MZI. Since the two arms have different refractive index distributions and different optical path differences, a phase difference is formed before the second coupler 140.

Further, to reduce the size and drive voltage of the device, the present embodiment uses a waveguide-based programmable modulation arm. It can be understood that the improved Mach-Zehnder structure has two input optical signal sources, so two different wavelength signals can be transmitted simultaneously in the MZI (Mach-Zehnder structure), which increases the information capacity, and the different wavelength signals do not interfere with each other and there is no information crosstalk.

Based on the above technical solution, in the present embodiment, the beam splitting ratio of the first coupler 110 and the voltage parameter of the programmable piezoelectric transducer 134 can be adjusted, and an ultrasonic field that changes in the form of an electrical signal is obtained according to the voltage parameter to form a nano-grating. A change in the refractive index of the grating causes a change in the phase of the light wave. When the second light wave beam passes through the programmable modulation arm, the light carrier wave is modulated into an intensity or phase modulated wave carrying information, i.e., the second signal, due to the diffraction effect of the grating, thus achieving modulation of the optical signal. The slot waveguide 121 of the sensing arm is a nano-slot, causing optical limitation and optical amplification of the first light wave beam at the nano-scale, and generating the first signal. Thus, the optical device of the present application can sense a small change in the environment. The small change leads to an optical phase shift, and the change of the environment can be obtained from the optical phase shift. After the first signal and the second signal are coupled by the second coupler 140, an optical signal with constructive or destructive interference is formed at the output end, and is finally detected by the photodetector. Hence, according to the present application, the optical logic gate operation can be performed according to an optical signal, biosensor detection can also be performed, the present application can adapt to multiple scenes, and the repeated use and sustained use of the device are promoted.

Further, to improve the sensitivity of signals, the slot waveguide 121 and the first strip waveguide 122 of the sensing arm, and the second strip waveguide 131 of the programmable modulation arm in the present embodiment are all high refractive index silicon waveguides.

Further, the slot waveguide 121 includes: a silicon dioxide substrate, a first silicon structure and a second silicon structure provided on the silicon dioxide substrate, wherein the distance between the first silicon structure and the second silicon structure is a nano-scale distance.

Figure 3:
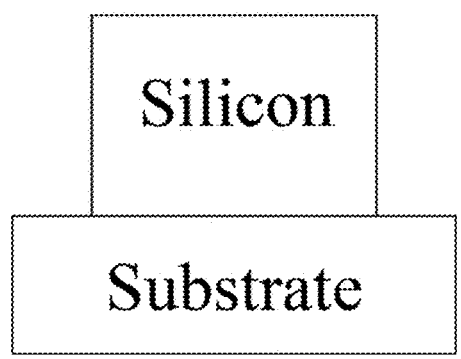
FIG. 3 is a transverse cross-sectional diagram of a strip waveguide provided in embodiments of the present application.
Figure 4:
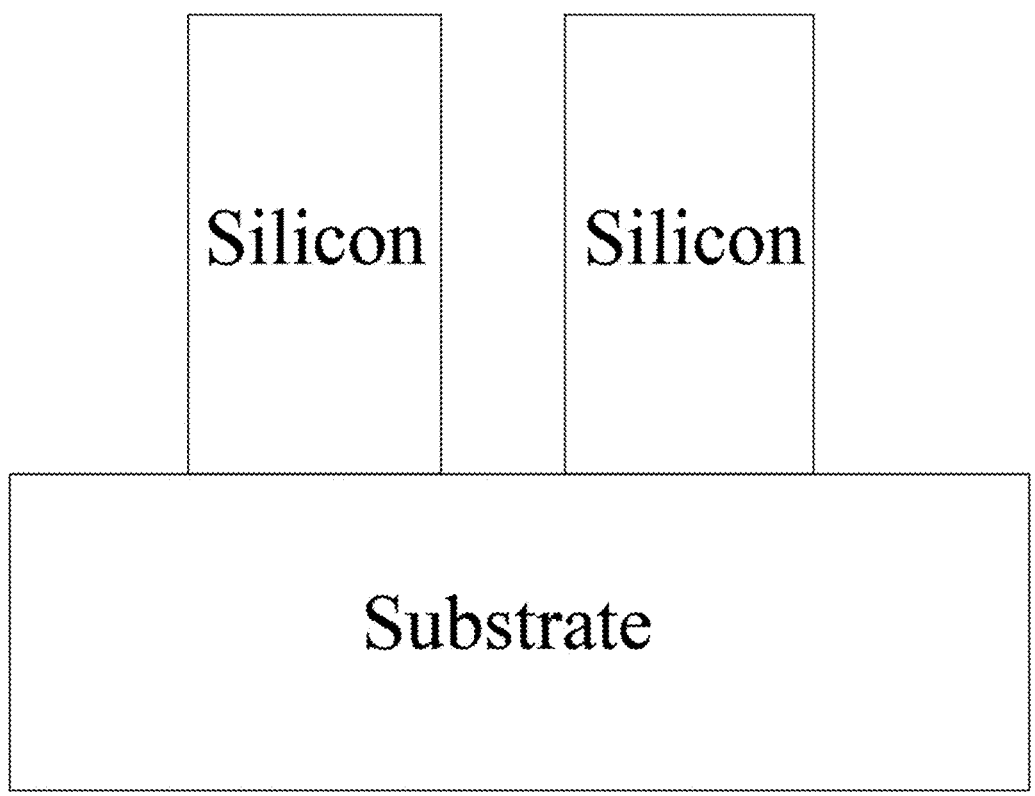
FIG. 4 is a transverse cross-sectional diagram of a slot waveguide provided in embodiments of the present application.

Further, the first strip waveguide 122 and the second strip waveguide 131 each include: a silicon dioxide substrate, and a silicon structure provided on the silicon dioxide substrate. In order to improve the compatibility with the existing electronic integrated circuit process, the present embodiment uses a silicon material with a high refractive index, and quartz with an acousto-optic modulation effect, which are processed and fabricated on the silicon dioxide substrates. The materials used are cheap, the processing cost is low, and mass production is facilitated. Referring to FIG. 3, FIG. 3 is a transverse cross-sectional diagram of the structure of a strip waveguide provided in an embodiment of the present application, and referring to FIG. 4, FIG. 4 is a transverse cross-sectional diagram of the structure of a slot waveguide provided in an embodiment of the present application. The structure in FIG. 3 is applicable to the first strip waveguide 122 and/or the second strip waveguide 131. In the present application, the sensing arm includes a slot waveguide 121 and a strip waveguide structure, the slot waveguide 121 occupying a small portion of the entire sensing arm.

Further, the programmable piezoelectric transducer 134 is a piezoelectric ceramic transducer. The piezoelectric ceramic transducer is convenient to fabricate, strong in manipulability, high in sensitivity and good in electromechanical coupling.

Further, the first coupler 110 and the second coupler 140 are both 50/50 couplers.

In summary, the present embodiment provides a general-purpose multifunctional Mach-Zehnder on-chip interferometer with integrated sensing and operation functions, implements optical transmission, optical amplification, and optical limitation by the optical waveguide structure, and implements logic operations and biosensing by optical interference phenomenon. A user can perform programing using computer software according to target functional requirement, and reconfigure the refractive index of the on-chip optical waveguide by means of a voltage-controlled acoustic wave, to form a Bragg grating structure, thereby achieving re-regulation and control of the optical signal. In order to improve the compatibility with the existing electronic integrated circuit process, the present embodiment uses a silicon material with a high refractive index, and quartz with an acousto-optic modulation effect, which are processed and fabricated on the silicon dioxide substrates. The materials used are cheap, the processing cost is low, and mass production is facilitated.

An electronic device provided in embodiments of the present application is described below. For the electronic device described below and the optical device described above, reference can be made to each other.

The present application provides an electronic device including an optical device as described above, wherein the electronic device is an optical logic gate and/or a biosensor.

In the case of a biosensor, due to changes in the surrounding environment such as thermal effect, biomolecules, etc., optical signals of the sensing arm and the programmable modulation arm are affected, such that optical signals outputted from the sensing arm and the programmable modulation arm, i.e., a first signal and a second signal change, which can be detected by the photodetector according to a first output optical signal and a second output optical signal that are outputted after the first signal and the second signal are coupled by the second coupler, Hence, in the case of a biosensor in the present embodiment, if biomolecules are small, both beams of optical signals are valid signals and need to pass through the two optical arms, and accurate signals can be obtained in this case; and if biomolecules are large, at least one of the two optical signals is a valid signal, mainly because a single waveguide may also be used as a biosensor, but signals obtained based on the interference phenomenon after passing through two optical arms are more accurate.

In the case of an optical logic gate in the present embodiment, logic operations are carried out to obtain high and low light intensity 1, 0 of the first output optical signal and the second output optical signal that are outputted, thereby achieving the function of the optical logic gate. The optical logic gate can operate while running logic operations, and biosensing may also be carried out simultaneously, and the first coupler for tunable light beams and the programmable piezoelectric transducer connected by an optical waveguide are controlled by an electrical signal. Under the control of the computer software controller, the optical signals are distributed in space and rerouted. In this case, a chip can implement various linear functions by interfering with light beams along different paths.

Figure 5:
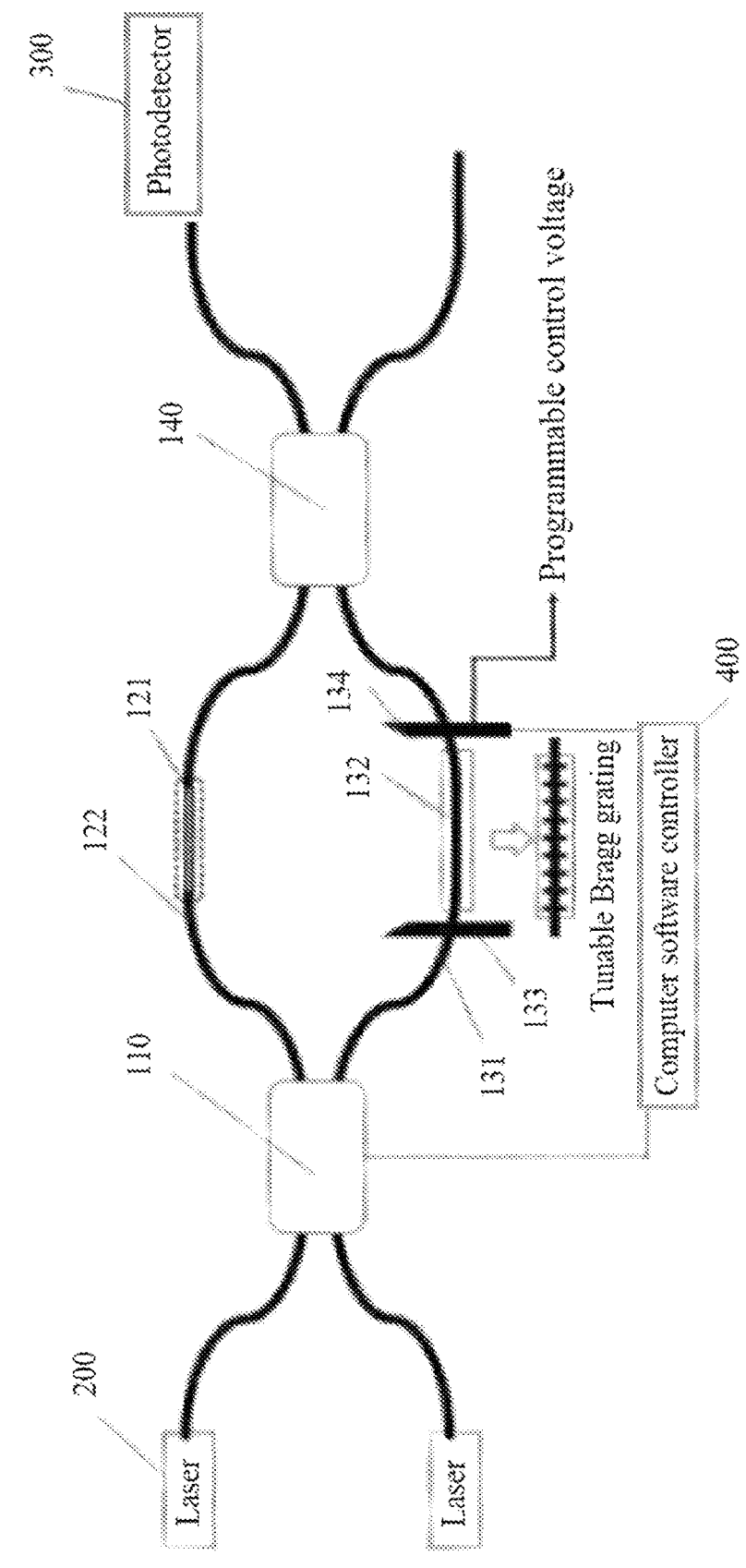
FIG. 5 is a structural diagram of a programmable photonic integrated circuit provided in embodiments of the present application.

A programmable photonic integrated circuit provided in embodiments of the present application is described below. For the programmable photonic integrated circuit described below and the optical device described above, reference can be made to each other. Referring to FIG. 5, FIG. 5 is a structural diagram of a programmable photonic integrated circuit provided in embodiments of the present application, including:

a laser 200;
an optical device as described above connected to the laser 200;
a photodetector 300 connected to the optical device; and
a computer software controller 400 connected to the optical device and configured to control a voltage parameter of a programmable piezoelectric transducer of the optical device.

In an embodiment of the present application, the computer software controller is further configured to control a beam splitting ratio of a first coupler of the optical device.

In an embodiment of the present application, the laser 200 is a tunable laser 200; and correspondingly, the computer software controller 400 is configured to control a light source parameter of the tunable laser 200, and the light source parameter corresponds to an input optical signal of a first coupler of the optical device.

A user can control three parts by programming a PICs device as needed. In a first part, laser light source lasers 200 can be adjusted, input wavelengths can be selected as needed, and output wavelengths of two lasers 200 can be same or different. Second and third parts mainly involve the optical device, specifically the first coupler and the programmable piezoelectric transducer of the optical device. The beam splitting ratio of the first coupler can be adjusted according to the actual situation. The programmable piezoelectric transducer is controlled by programming, and an input acoustic wave is controlled by voltage, so that a nanometer Bragg grating is formed on the strip waveguide of the quartz crystal. Structural parameters of the Bragg grating are adjustable and controllable by the computer software controller 400, and its refractive index changes with the period, causing phase modulation in the path of light wave transmission.

The present embodiment proposes an on-chip programmable general-purpose micro/nano optical device-programmable photonic integrated circuit, which facilitates optical signal processing, and has the advantage of functional integration of communication, sensing, and broadband signal processing. Compared with a traditional customized photonic integrated circuit, this device is controlled by computer programming, and the repeated use and sustained use of the device are promoted. A user can program the device, and correct minor errors in the manufacturing process at the same time.

It can be understood that key modules in the present embodiment include the tunable laser 200, the slot waveguide of the optical device, the tunable first coupler of the optical device, and the programmable piezoelectric transducer of the optical device, and all modules should have low insertion loss and low power consumption and be integrated on a same chip.

This embodiment is an improved on-chip Mach-Zehnder optical interferometer. By introducing computer technology, the slot waveguide structure, and the piezoelectric control module, optical signals can be modulated while logic operations are carried out thereon by the optical logic gate, and biosensing may also be performed at the same time, thus forming a general-purpose multifunctional composite optical computing device.

In an embodiment of the present application, a plurality of optical devices are included, and the plurality of optical devices are cascaded.

The optical device has a small size, wide applicability, and broad prospects for applications. Controlled by the computer software controller, various complex operational functions and system upgrades can be achieved by configuring algorithms in practical applications. Moreover, the 2×2 coupler (optical device) facilitates cascading, and is more flexible in regulation and control and highly extensible. In general, light is transmitted in one direction, and can be controlled at each stage using the optical device. This architecture can be programmed for simple progressive design and can be reconfigured for certain complex situations and problems.

The first output optical signal and the second output optical signal of the present embodiment are a linear combination of optical signals at the input end. The optical device of the present embodiment can be applied in the fields including but not limited to: quantum information processing, artificial neural networks, nano-optical communication, 5G miniaturized wireless systems, aerospace miniaturized radio frequency systems, etc.

Since the embodiment of the programmable photonic integrated circuit part and the embodiment of the interferometer part correspond to each other, for the embodiment of the programmable photonic integrated circuit part, please refer to the description of the embodiment of the interferometer part, which will not be repeated here.

The embodiments in the specification are described in a progressive manner. Each embodiment focuses on differences from other embodiments. For the same and similar parts between the embodiments, reference can be made to each other. An apparatus disclosed in embodiments corresponds to a method disclosed in embodiments, and thus is described relatively simply, and for its relevant parts, reference can be made to description of the method part.

Professionals may also further realize that the units and algorithmic steps of the examples described in conjunction with the embodiments disclosed herein can be implemented by means of electronic hardware, computer software, or a combination thereof. To clearly illustrate the interchangeability of hardware and software, the composition and steps of each example have been described generally by functions in the above description. Whether these functions are performed in hardware or software depends on the specific application and design constraints of the technical solution. A professional person skilled in the art can use different methods to implement the described functions for each specific application, but such implementation should not be considered as beyond the scope of the present application.

The steps of the methods or algorithms described in conjunction with the embodiments disclosed herein may be implemented directly by means of hardware, a software module executed by a processor, or a combination thereof. The software module may be stored in a random access memory (RAM), an internal storage, a read-only memory (ROM), an electrically programmable ROM, electrically erasable programmable ROM, a register, a hard disk, a removable disk, a CD-ROM, or a storage medium in any other form known in the technical field.

An optical device, an electronic device and a programmable photonic integrated circuit provided in the present application have been described in detail above. Specific examples are used herein to illustrate the principles and implementations of the present application, and the description of the above embodiments is only used to help understand the method of the present application and its core idea. It should be noted that to those of ordinary skill in the art, a number of improvements and modifications may also be made to the present application without departing from the principles of the present application, and these improvements and modifications also fall within the protection scope of the claims of present application.

The invention claimed is:

1. An optical device, comprising:
a first coupler having an adjustable beam splitting ratio;
a sensing arm and a programmable modulation arm which are connected to the first coupler, wherein the sensing arm is configured to generate, by means of a slot waveguide, a first signal from a first light wave beam outputted by the first coupler, and the programmable modulation arm is configured to obtain, by utilizing the diffraction effect of a grating, a second signal according to a second light wave beam outputted by the first coupler, wherein the grating is a nano grating generated under a pre-programmed voltage parameter of a programmable piezoelectric transducer of the programmable modulation arm; and
a second coupler having an input port connected to the sensing arm and the programmable modulation arm and an output port connected to a photodetector.

2. The optical device according to claim 1, wherein the programmable modulation arm comprises a second strip waveguide, a quartz crystal that encapsulates a predetermined length of the second strip waveguide, and a sound absorber and the programmable piezoelectric transducer that are provided on two sides of the quartz crystal,
wherein the corresponding grating is formed within the second strip waveguide in the quartz crystal under the pre-programmed voltage parameter of the programmable piezoelectric transducer, and the second signal is generated from the second light wave beam under the diffraction effect of the grating.

3. The optical device according to claim 2, wherein the sensing arm comprises the slot waveguide and a first strip waveguide, wherein the slot waveguide is provided at a set position on the first strip waveguide.

4. The optical device according to claim 3, wherein the slot waveguide and the first strip waveguide of the sensing arm, and the second strip waveguide of the programmable modulation arm are all silicon waveguides.

5. The optical device according to claim 4, wherein the slot waveguide comprises: a silicon dioxide substrate, a first silicon structure and a second silicon structure provided on the silicon dioxide substrate, wherein the distance between the first silicon structure and the second silicon structure is a nanoscale distance.

6. The optical device according to claim 4, wherein the first strip waveguide and the second strip waveguide each comprise: a silicon dioxide substrate, and a silicon structure provided on the silicon dioxide substrate.

7. The optical device according to claim 1, wherein the programmable piezoelectric transducer is a piezoelectric ceramic transducer.

8. An electronic device, comprising an optical device as claimed in claim 1, wherein the electronic device is an optical logic gate and/or a biosensor.

9. A programmable photonic integrated circuit, comprising:
a laser;
an optical device as claimed in claim 1 connected to the laser;
a photodetector connected to the optical device; and
a computer software controller connected to the optical device and configured to control a voltage parameter of a programmable piezoelectric transducer of the optical device.

10. The programmable photonic integrated circuit according to claim 9, wherein the computer software controller is further configured to control a beam splitting ratio of a first coupler of the optical device.

11. The programmable photonic integrated circuit according to claim 9, wherein the laser is a tunable laser; and
correspondingly, the computer software controller is configured to control a light source parameter of the tunable laser, and the light source parameter corresponds to an input optical signal of a first coupler of the optical device.

12. The programmable photonic integrated circuit according to claim 9, comprising a plurality of optical devices, and the plurality of optical devices are cascaded.

13. The programmable photonic integrated circuit according to claim 9, wherein the computer software controller is configured to control the programmable piezoelectric transducer, wherein an input acoustic wave is controlled by voltage, so that a nanoscale Bragg grating is formed within a second strip waveguide in a quartz crystal, and structural parameters of the Bragg grating are adjustable and controllable by the computer software controller.

14. The programmable photonic integrated circuit according to claim 13, wherein the Bragg grating is any one of a uniform grating, a uniform long-period grating, an apodized grating, a phase-shifted grating, a sampled grating, or a chirped grating.

15. The optical device according to claim 1, wherein the beam splitting ratio of the first coupler is modifiable by a computer software controller, and a ratio of the first light wave beam to the second light wave beam is determined by modifying the beam splitting ratio.

16. The optical device according to claim 1, wherein the first signal and the second signal, after being coupled at the second coupler, form constructive or destructive interference at an output end of the second coupler to obtain a first output signal and a second output signal, which are detected by the photodetector.

17. The optical device according to claim 1, wherein a light wave range of an input optical signal is in the infrared band.

18. The optical device according to claim 2, wherein the programmable modulation arm further comprises an acousto-optic modulation module which acts on the second strip waveguide through an encapsulating layer of the quartz crystal.

19. The optical device according to claim 18, wherein, in response to the second light wave beam passing through the programmable modulation arm, the second light wave beam is modulated into an intensity or phase modulated wave which carries information and serves as the second signal, due to the diffraction effect of the grating.

20. The optical device according to claim 5, wherein a nano-slot of the slot waveguide is configured to cause optical field limitation and amplification of an evanescent wave at a nanoscale, which can sense a small change in the nearby environment, leading to an optical phase shift.

\* \* \* \* \*